No. 678,979. Patented July 23, 1901.
G. E. RIDGWAY.
APPARATUS FOR SPREADING LIQUIDS ONTO FILTER BEDS.
(Application filed Apr. 30, 1901.)
(No Model.) 2 Sheets—Sheet 1.
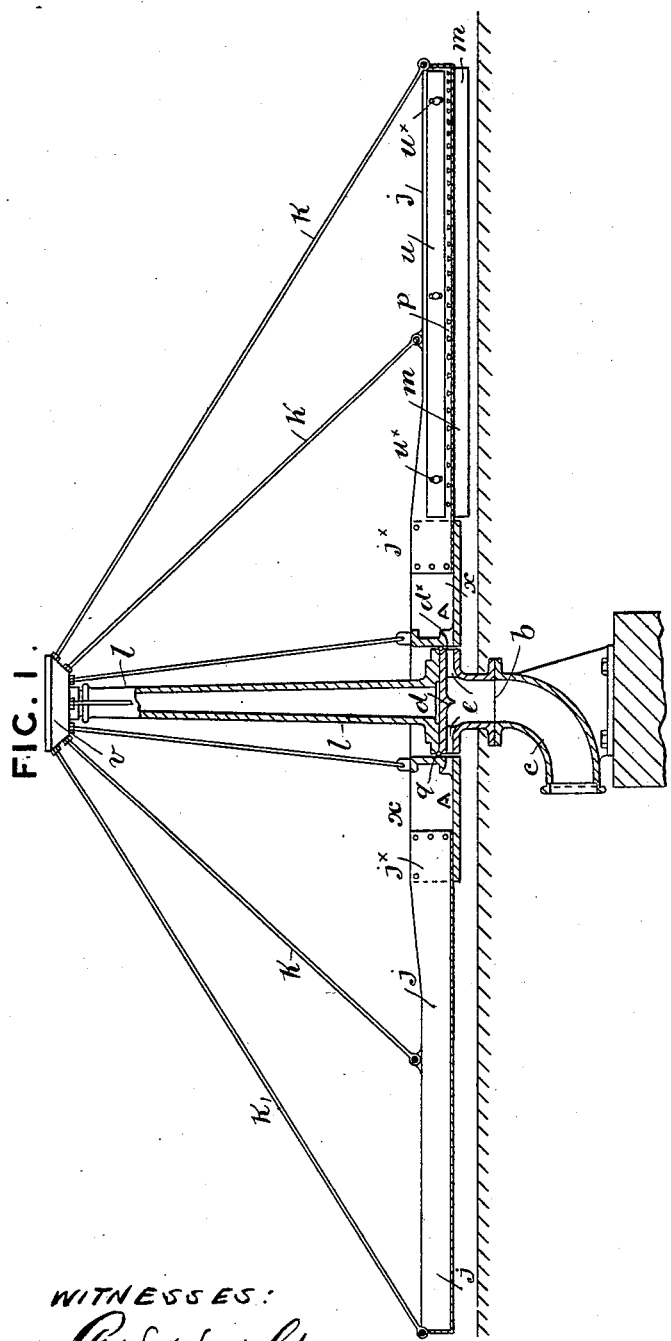
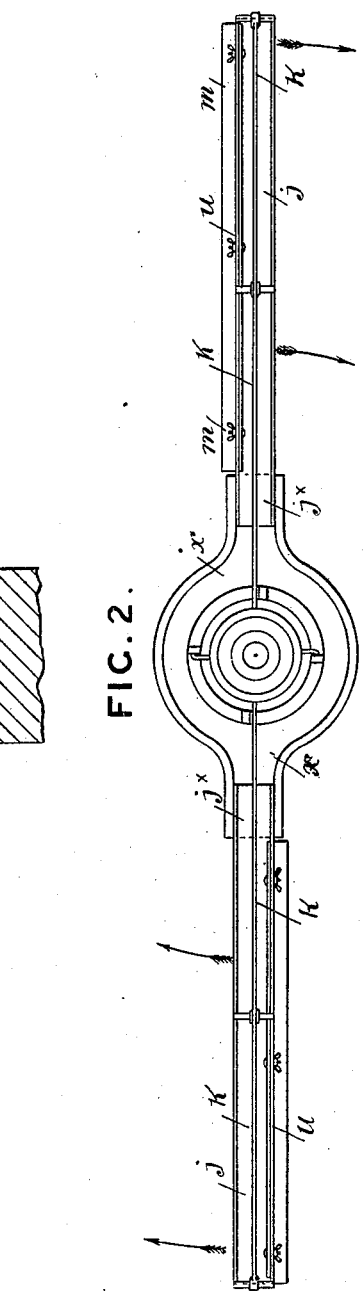
WITNESSES:
F. W. Wright.
S. C. Connor.
INVENTOR
GEORGE EDWARD RIDGWAY
BY Howson and Howson
HIS ATTORNEYS.

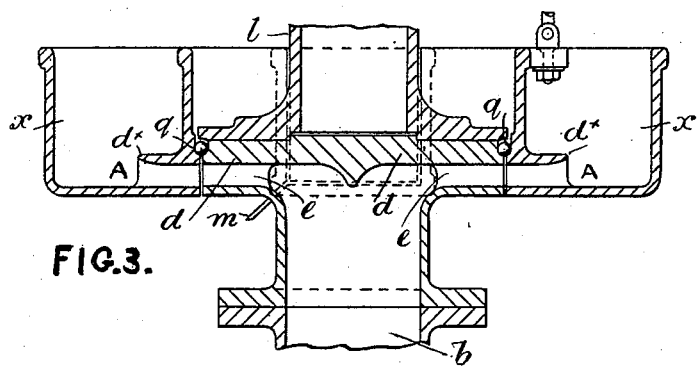
FIG.3.
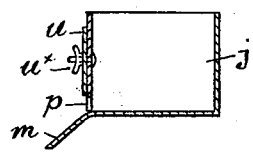
FIG.5
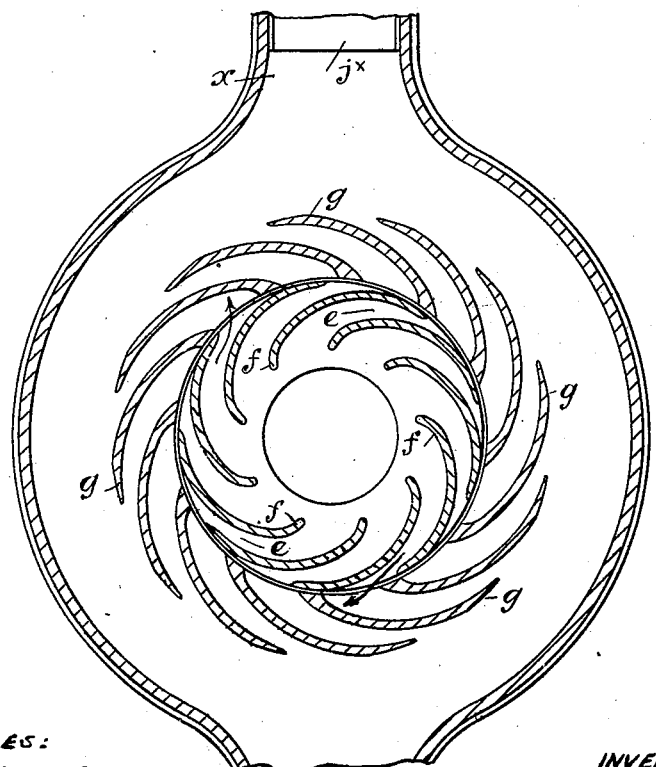

UNITED STATES PATENT OFFICE.

GEORGE EDWARD RIDGWAY, OF BRENTWOOD, ASHLEY, ENGLAND.

APPARATUS FOR SPREADING LIQUIDS ONTO FILTER-BEDS.

SPECIFICATION forming part of Letters Patent No. 678,979, dated July 23, 1901.

Application filed April 30, 1901. Serial No. 58,197. (No model.)

*To all whom it may concern:*

Be it known that I, GEORGE EDWARD RIDGWAY, a subject of the King of Great Britain, residing at Brentwood, Ashley, in the county of Chester, England, have invented new and useful Improvements in Apparatus for Spreading Liquids Over Given Areas, Primarily Applicable for Distributing Sewage onto Filter-Beds, of which the following is a specification.

The object of this my invention is principally to provide means for efficiently spreading in the form of a shower or spray sewage in a fluid state in equal proportions over filter-beds having a large or small area, so as to prevent any portion of the surfaces of the filter-beds getting more than its proportionate share and for preventing the apparatus becoming choked or clogged by an accumulation of solid particles.

My invention is also alike applicable for spreading other fluids over given areas.

In the accompanying drawings, Figure 1 is a vertical section of the apparatus, and Fig. 2 a plan of the same. Figs. 3, 4, and 5 are details of portions of the apparatus drawn to an enlarged scale.

In the drawings similar letters refer to similar parts.

The invention consists of a feed-pipe placed beneath the surface of the filter-bed (if employed in the filtration of sewage) by which the fluid to be distributed is conveyed to the center of the apparatus, said feed-pipe terminating in a bend $c$, so that the end $b$ is placed in a vertical position. This end is either formed with or has affixed thereto a cover $d$ of larger diameter than the bore of the pipe-bend $c$ and has tangential openings $e$ formed under said cover, as shown in Fig. 5, which is a sectional plan on line A A, Fig. 1, and drawn to an enlarged scale. The outer portion $d^\times$ of the cover is detached from the main portion, so that said outer portion can be revolved, and is provided with tangential openings formed by the blades $g$, which are placed in a reverse position to the blades $f$, that are formed on the under side of the fixed cover $d$. Two or more trough-shaped projections $x$ are formed on or fitted to the outer portion $d^\times$ of the cover, and the inner ends $j^\times$ of the troughs, as $j$, are attached thereto. The outer ends of said troughs are supported by the rods, as $k$, that are connected to a cap $v$, resting on a pivot fitted at the top of a pillar, as $l$, which is placed in the center of the apparatus and secured to the fixed portion $d$ of the cover. The weight of the troughs $j$ is thus carried by the pillar $l$, and both the troughs $j$ and the outer portion $d^\times$ of the cover are easily moved around by the pressure of the fluid passing from the inlet through the tangential openings $e$ and striking against the tangential blades $g$. Friction is reduced by placing balls $q$ or an equivalent between the outer bottom edge of the base of the pillar $l$ and the upper inner edge of the revolving portion $d^\times$ of the cover. The troughs $j$ are formed as shown in cross-section in Fig. 4. Either perforated or longitudinal openings $p$ are provided at the bottom of the rear side of the trough $j$, and the outlet from these openings is regulated by the plate $u$, which can be raised or lowered more or less at either end, so as to cover or partially cover any of the holes or openings, or said plate may be fixed in a position parallel with the bottom of the trough, the adjustment being effected by means of set-screws, as $u^\times$, or an equivalent. If the outlet is through perforations, as $p$, these may be farther apart near the center of the apparatus and the distance between each perforation gradually reduced toward the outer end of the trough. A plate, as $m$, is fixed to project from the bottom of the trough in an angular position, over which the fluid passes and is distributed. When the fluid is ejected from the aforesaid openings $e$, it passes along the troughs $j$, and the liquid flows toward the outer ends of the troughs, and the troughs are revolving in the directions indicated by the arrows in Fig. 2. It is distributed evenly over the surface of the filter-beds of other required area through the aforesaid openings.

I claim as my invention—

1. The improved apparatus for spreading sewage or other liquids over filter-beds, consisting of troughs, and means for imparting rotary motion to the troughs, said means being adapted to be operated by the flow of the sewage itself, as and for the purpose described.

2. The improved apparatus for spreading sewage over given areas, consisting of troughs, adapted to be moved rotarily, a supply-pipe, blades and openings between the supply-pipe and troughs whereby the troughs are caused to rotate upon the flow of sewage, substantially as described.

3. The improved apparatus for spreading sewage over given areas, consisting of troughs adapted to be moved rotarily, a supply-pipe, having tangential openings $e$ and blades $f$, blades $g$ mounted at the inner ends of the troughs whereby the troughs are caused to turn upon the flow of sewage in combination with the regulating-plate $u$, substantially as described.

4. The improved apparatus for spreading sewage over given areas, consisting of a pillar, troughs radially arranged about the pillar and suspended therefrom, a supply-main opening to the axis of the troughs, vanes and openings between the supply-main and the radially-arranged troughs whereby on the flow of sewage through the main, the troughs will be caused to revolve, as and for the purpose set forth.

5. In apparatus having troughs for spreading sewage or other fluids over filter-beds or other given areas the combination with said troughs of an adjustable plate as $u$ for regulating the outflow substantially as hereinbefore described.

6. The improved apparatus for spreading sewage or other fluids over filter-beds or other given areas consisting of radial troughs as $j$ that are supported by a central pillar as $l$ and caused to rotate by the fluid from a central feed acting on tangential blades as $g$ in combination with blades as $f$, and with a plate $u$ affixed to the troughs for regulating the outflow therefrom all substantially as described.

In testimony whereof I have signed my name to this specification in the presence of two subscribing witnesses.

GEORGE EDWARD RIDGWAY.

Witnesses:
  JNO. HUGHES,
  J. ERNEST HUGHES.